(12) United States Patent
Chu et al.

(10) Patent No.: US 6,842,215 B2
(45) Date of Patent: Jan. 11, 2005

(54) PANEL AND FLAT-PANEL DISPLAY DEVICE CONTAINING THE SAME

(75) Inventors: Hung-Jen Chu, Nantou (TW); Ming-Hsuan Chang, Sanchung (TW); Chien-Kuo Ho, Taipei (TW)

(73) Assignee: Chunghwa Picture Tubes Ltd., Taipei (TW)

( * ) Notice: Subject to any disclaimer, the term of this patent is extended or adjusted under 35 U.S.C. 154(b) by 64 days.

(21) Appl. No.: 10/347,798

(22) Filed: Jan. 22, 2003

(65) Prior Publication Data

US 2003/0142261 A1 Jul. 31, 2003

(30) Foreign Application Priority Data

Jan. 23, 2002 (TW) ........................ 91200643 U

(51) Int. Cl.⁷ .......................................... G02F 1/1345
(52) U.S. Cl. ............................................ 349/152
(58) Field of Search ........................ 349/149–152

(56) References Cited

U.S. PATENT DOCUMENTS 5,636,329 A * 6/1997 Sukegawa et al. .......... 349/149
5,930,607 A * 7/1999 Satou .......................... 438/158
6,577,371 B2 * 6/2003 Hirabayashi ................ 349/149

* cited by examiner

Primary Examiner—Toan Ton
(74) Attorney, Agent, or Firm—Bacon & Thomas, PLLC

(57) ABSTRACT

A panel for a flat panel display device is disclosed, which includes a substrate having signal wires and terminals respectively connected to the signal wires, each terminal having first, second and third conducting layer, an insulating layer, a protection layer, contact holes connected between the first conducting layer and the third conducting layer, and contact holes connected between the second conducting layer and the third conducting layer, the insulating layer being sandwiched in between the second conducting layer and the substrate, the first conducting layer being sandwiched in between the protection layer and the insulating layer, the protection layer being sandwiched in between the first conducting layer and the third conducting layer or the second conducting layer and the third conducting layer, the first conducting layer being isolated from the second conducting layer.

14 Claims, 3 Drawing Sheets

PANEL AND FLAT-PANEL DISPLAY DEVICE CONTAINING THE SAME

BACKGROUND OF THE INVENTION

1. Field of the Invention

The present invention relates to a panel for a flat panel display device and, more particularly, to a pane for a flat panel display device having terminals for a flat-panel display device.

2. Description of Related Art

A panel for a flat panel display device (e.g. a liquid crystal display panel) generally has an active region 110 (or a display region), a terminal lead wire region 120, and a terminal region 130 (as shown in FIG. 1). The active region (or a display region) 110 comprises pixels, functional switch elements (e.g. thin film transistors), and signal wires crossed over one another (including source/drain signal wires and gate signal wires) for displaying images. The terminal lead wire region 120 surrounds the active region (or a display region) 110 for connecting the signal wires (including source/drain signal wires and gate signal wires) of the active region (or a display region) 110. Furthermore, the terminal region 130 also surrounds the terminal lead wire region 120. The terminal region 130 comprises a plurality of terminals 132 corresponding to the signal wires of the active region 110 for signal input to drive the active region (or a display region) 110 to display images. The terminals 132 of the terminal region 130 are connected to IC chips for controlling the displaying performance of the active region (or a display region) 110. In a conventional panel, the terminals include gate terminals aid source terminals. Each terminal has a guard and a buffer on the outer side close to the end or the edge. A gate terminal, as shown in FIG. 2B, is a gate signal lead wire 210 connecting terminal formed on the panel substrate with the gate or the gate signal wire. The method for manufacturing terminals is similar to that for manufacturing gates or gate signal wires. The materials (for example chromium or alloys containing chromium) and the thickness (or the height) of the layer of the terminal lead wire of a gate terminal are similar to that of the gate or gate signal wire. Because the terminal conductor wire 220 and insulating layer 230 of each gate terminal are simultaneously formed on the surface of the flat panel display device with the respective gate lead wire of the active region (or display region), it has good adherence with the glass substrate. Therefore, the gate terminal lead wires 220 are smoothly disposed in the surface of the glass substrate after the border edge of the face panel has been well ground (to remove the outer side of the terminals).

However, the situation for the source terminals is another story different from that of the gate terminals. As shown in FIG. 2A, source terminal lead wires 280 and source terminal conductor wires 260 are simultaneously made with source signal wires. Therefore, source terminal lead wires 260 and source signal wires have the same structure, each comprising a source terminal conductor wire layer 260, a source terminal lead wire 280, a protection layer 290 sandwiched between the source terminal conductor wire 260 and the source terminal lead wire 280, and an insulating layer 270 (for example, silicon nitride) sandwiched between the terminal conductor wire 260 (or source terminal lead wire 280) and the glass substrate 250.

During the fabrication process, a grinding (or polishing) procedure is performed to grind away buffer regions and guards from the terminal region after formation of the circuitry in the active region (or display region) and terminal region of the substrate. According to structure of conventional panels, due to the weak adherence between the insulating layer (for example, silicon nitride) and the glass substrate, the grinding of the source terminal wire layer may cause a serious releasing of the insulating layer from the glass substrate and further results a contact error or short circuit of the connected IC chips or terminal circuitry when connecting IC chips to the terminal circuitry. These drawbacks result in low yield of the fabrication of flat panel display device.

Therefore, it is desirable to provide a flat panel display device to eliminate the aforesaid drawbacks.

SUMMARY OF THE INVENTION

It is the main object of the present invention to provide a panel for a flat panel display device having terminal lead wires with improved adherence between the terminal circuitry and the substrate, less possibility of terminal short circuit, and higher yield for fabricating the flat panel display device.

Another object of the present invention to provide a panel for a flat panel display device having terminal lead wires with improved adherence, between the terminal circuitry and the substrate, less possibility of terminal between the terminal circuitry and the substrate, less possibility of terminal short circuit, and higher yield for fabricating the flat panel display device To achieve this and other objects of the present invention, the panel for a flat panel display device comprising: a substrate; a plurality of signal wires arranged on said surface of said substrate; and a plurality of terminals arranged on said surface of said substrate and respectively connected to said signal wires; wherein each terminals comprises a first conducting layer, a second conducting layer, a third conducting layer, an insulating layer, a protection layer, and a plurality of contact holes, said insulating layer is sandwiched between said second conducting layer and said surface of said substrate, said first conducting layer is sandwiched between said protection layer and said insulating layer, said protection layer is sandwiched between said first conducting layer and said third conducting layer or is sandwiched between said second conducting layer and said third conducting layer, said third conducting layer and said first conducting layer is connected through at least one contact hole, said third conducting layer and said second conducting layer is connected through at least one contact hole, and said first conducting layer doesn't connect said second conducting layer.

The invention uses jumper wire structure to connect source lead wires to source terminal lead wires of same structure as gate lead wires or gate terminal lead wires, so as to improve the adherence between source terminal lead wires and glass substrate, and to lower the possibility of short circuit between source terminal lead wires.

Other objects, advantages, and novel features of the invention will become more apparent from the following detailed description when taken in conjunction with the accompanying drawings.

DETAILED DESCRIPTION OF THE PREFERRED EMBODIMENT

The terminal structure of the present invention is suitable for use in any flat panel display device, preferably for use in a liquid crystal display device. The material for the first conducting layer of the flat-display face panel of the flat panel display device of the present invention is, not particularly limited. Preferably, the first conducting layer is made of chromium or alloys containing chromium. The material for the second conducting layer of the of the flat panel display device of the present invention is not particularly limited. Preferably, the second layer is made of chromium, alloys containing chromium, aluminum and alloys containing aluminum. The material for the third conducting layer of the panel of the flat panel display device of the present invention is not particularly limited. Preferably, the third conducting layer is made of indium oxide. The material for the insulating layer of the panel of the flat panel display device of the present invention is not particularly limited. Preferably, the insulating layer is made of nitride. Most preferably, the insulating layer is made of silicon nitride. The material for the protection layer of the panel off the flat panel display device of the present invention is not particularly limited. Preferably, the protection layer of panel of the flat panel display device of the present invention is made of nitride or oxide. Most preferably, the protection layer of eth panel of the flat panel display device of the present invention is made of silicon nitride. There is no particular limitation for the relative position between the first conducting layer and the second conducting layer of the panel of the flat panel display device of the present invention. Preferably, the projections of the first conducting layer and second conducting layer of the flat panel display device of the present invention are not overlapped. The terminals of the panel of the flat panel display device of the present invention may be selectively provided with a buffer region. Preferably, the buffer region, comprises at least one buffer conducting layer. In the panel of the flat panel display device of the present invention, the buffer conducting layer is not directly connected to the first conducting layer. However the buffer conducting layer is connected to the first conducting layer by at least one contact hole. The terminals of the panel of the flat panel display device of the present invention may be selectively provided with a guard at one end of the corresponding buffer region.

The present invention will now be described by way of examples with reference to the drawings of the present invention.

Figure 1:
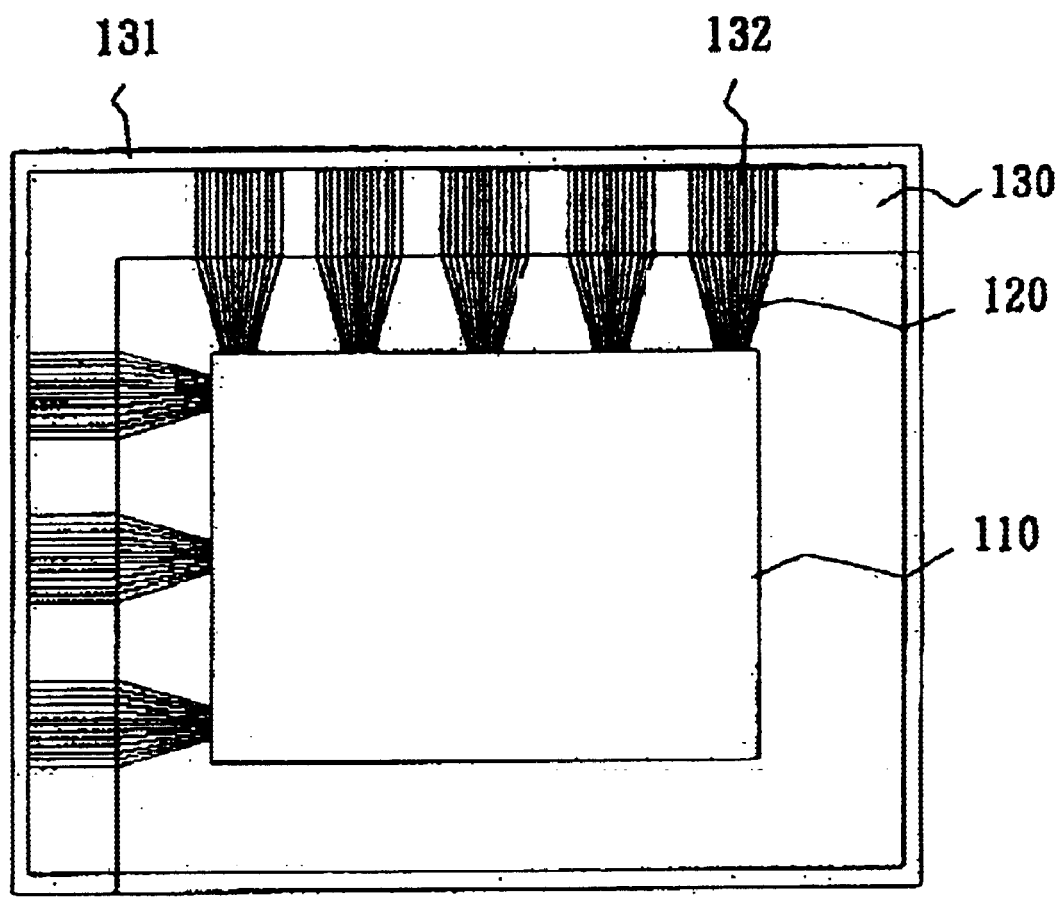
FIG. 1 illustrates the arrangement of the active region (or the display region), lead wire region, and terminal region of a conventional flat panel display device.
Figure 2A:
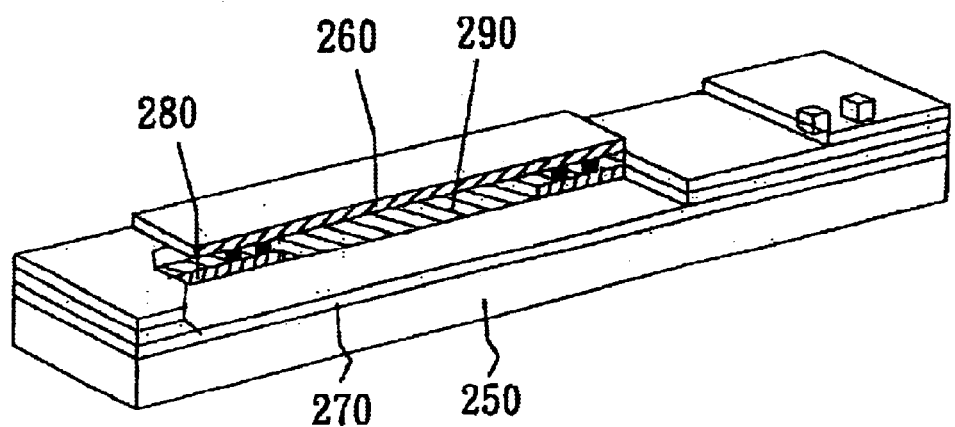
FIGS. 2A and 2B are sectional views showing the arrangement of source terminal and gate terminal in the flat-display face panel according to the prior art.
Figure 2B:
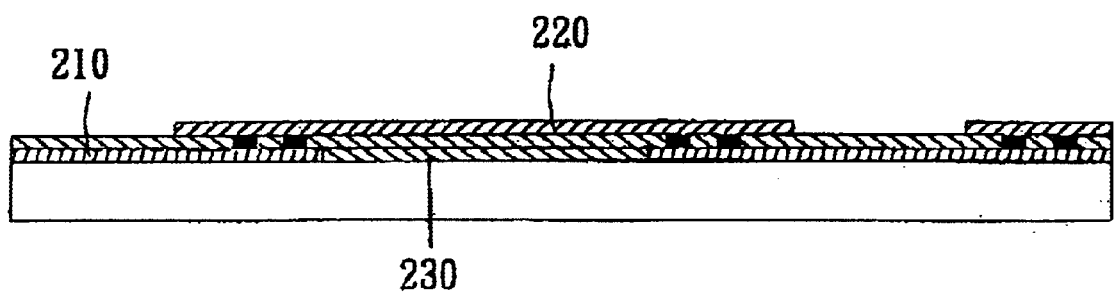

With reference to FIG. 1, a the panel of the flat panel display device of the present invention has three regions, namely, the central active region (or the display region) for displaying images, the outer terminal region provided with multiple terminals for the connection with IC chips, and an intermediate lead-wire region between the central active region (or the display region) and the outer terminal region for the extending of signal lead wires from the central display region to the corresponding terminals the outer terminal region.

Figure 3:
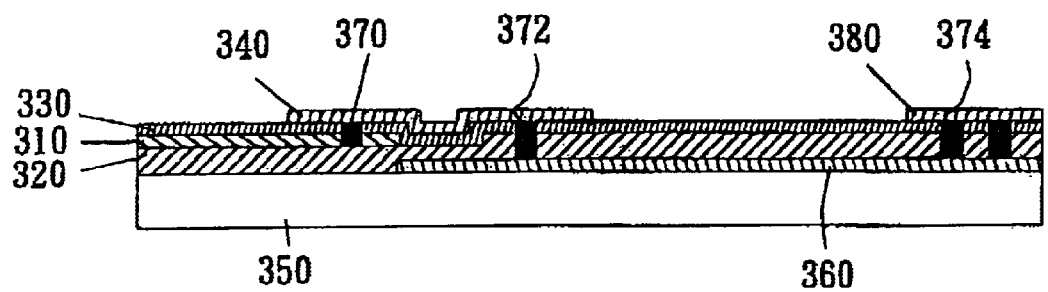
FIG. 3 is a sectional view showing the arrangement of a source terminal in a flat panel display device according to the present invention.

FIG. 3 is a sectional view of a part of the flat display panel, showing the positioning of one source lead wire and one terminal lead wire in the terminal region. As illustrated, a source lead wire 310 is arranged on a glass substrate 350 adjacent to one end of the active region (or the display region). The source lead wire 310 is made of chromium or alloys containing chromium. An insulating layer 320 is sandwiched between the source lead wire 310 and the glass substrate 350. A terminal conductor wire 360 is arranged on the glass substrate 350 adjacent to the end of the source lead wire 310. However, this terminal conductor wire 360 is made of same material for gate lead wires and not directly connected to the source lead wire 310. An insulating layer of silicon nitride is provided between the terminal conductor wire 360 and the source lead wire 310. This insulating layer of silicon nitride extends to the top of the terminal conductor wire 360, and then covers over and extends outwards with the terminal conductor wire 360.

The top side of the source lead wire 310 or the insulating layer of silicon nitride covering the terminal conductor wire 360 forms a protection layer of silicon nitride 330 that protects and isolates the top side of the source lead wire 310 or the insulating layer 320. A third conducting layer 340 (indium oxide) and a buffer conducting layer 380 are formed at the top side of the protection layer 330 corresponding to the region between the source lead wire 310 and the terminal conductor wire 360. A plurality of contact holes 370 are made through the third conducting layer 340 and connected between the buffer conducting layer 340 and the source lead wire 310. A plurality of contact holes 372 are made through the insulating layer 320 and the protection layer 330 and connected between the third conducting layer 340 and the terminal conductor wire 360. A plurality of contact holes 374 are made through the insulating layer 320 and the protection layer 330 and connected between the buffer conducting layer 380 and the terminal conductor wire 360.

Preferably, the terminal lead wire layer of the source lead wire terminal is simultaneously formed with the formation of the gate when forming the gate signal wire on the surface of the glass substrates. Thereafter, the gate insulating layer, the source signal wire, the source lead wire, and the buffer lead wire are formed in proper order. After the formation of the buffer lead wire, the protection layer is formed at the top of the source lead wire or the insulating layer, and then the buffer lead wire and the contact holes are formed in proper order. There are also gate lead wire terminals on the face panel. The formation of such gate lead wire terminals is same as the prior art designs.

In practical application of the terminal lead wire according to the present invention, a buffer lead wire can be formed and connected to the terminal lead wire close to the border area of the panel. The buffer lead wire is isolated from the terminal lead wire by an insulating layer. However, contact holes are provided for transmitting electric current between the buffer lead wire and the terminal lead wire. A guard may be connected. The guard is also mounted static eliminator wires, which connect and surround guards (lead wires that connect guards around the border area of the face panel) to protect elements on the panel from the impact of static electricity. Before connecting the IC chips, the buffer region and the border area close to the edge of the panel are ground away. The well ground panel with terminals can then be bonded or connected with IC chips to form a flat panel display module or a flat panel display device.

Figure 4:
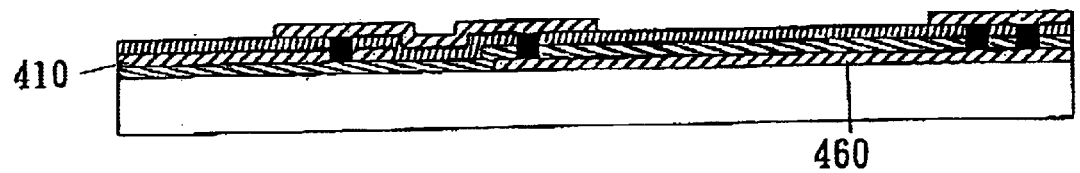
FIG. 4 is a sectional view showing the arrangement of a source terminal in a flat panel display device according to alternate form of the present invention.

FIG. 4 shows an alternate form of the present invention. This embodiment is similar to the aforesaid embodiment with the exception that the projection of the source lead wire 410 on the panel and the projection of the terminal conductor wire 460 on the panel are not overlapped. In the present embodiment, the space between projection of the source lead wire 410 and the projection of the terminal conductor wire 460 is at a pitch about 10 μm.

According to the panel or terminal % structure of the present invention, the lead wire terminals are electrically connected to the laminated layer (terminal lead wire layer) by jumper wires and contact holes. Therefore, the arrangement of the terminal lead wire layer does not cause the problem of disintegration due to poor bonding between the silicon nitrate and the glass substrate during assembly of source lead wires as encountered in the prior art designs, and the possibility of short circuit is drastically lowered after formation of face panel terminals. In general, the invention eliminates the unexpected short circuit problem as frequently seen in conventional source lead wire formation methods, and greatly improves the yield of the fabrication of face panels.

Although the present invention has been explained in relation to its preferred embodiments, it is to be understood that many other possible modifications and variations can be made without departing from the spirit and scope of the invention as hereinafter claimed.

What is claimed is:

1. A panel for a flat panel display device comprising:

a substrate;

a plurality of signal wires arranged on said surface of said substrate; and a plurality of terminals arranged on said surface of said substrate and respectively connected to said signal wires;

wherein each terminals comprises a first conducting layers a second conducting layer, a third conducting layer, an insulating layer, a protection layer, and a plurality of contact holes, said insulating layer is sandwiched between said second conducting layer and said surface of sad substrate, said first conducing layer is sandwiched between said protection layer and said insulating layer, said protection layer is sandwiched between said first conducting layer and said third conducting layer or is sandwiched between said second conducting layer and said third conducting layer, said third conducting layer and said first conducting layer is connected through at least one contact hole, said third conducting layer and said second conducting layer is connected through at least one contact hole, and said first conducting layer doesn't connect said second conducting layer.

2. The panel for a flat panel display device as claimed in claim 1, wherein each terminal further comprises a buffer region having at least one buffer conducting layer, and said first conducting layer connected to said first conducting layer through at least one contact hole.

3. The panel for a flat panel display device as claimed in claim 2, wherein each terminal further comprises a guard disposed at one end of the buffer region of the respective terminal.

4. The panel for a flat panel display device as claimed in claim 1, wherein said first conducting layer is made of chromium or alloys containing chromium.

5. The panel for a flat panel display device as claimed in claim 1, wherein said second conducting layer is made, of material selected from chromium, alloys containing chromium, aluminum and alloys containing aluminum.

6. The panel for a flat panel display device as claimed in claim 1, wherein said third conducting layer is made of indium tin oxide.

7. The panel for a flat panel display device as claimed in claim 1, wherein said insulating layer is made of nitride.

8. The panel for a flat panel display device as claimed in claim 1, wherein said protection layer is made of nitride.

9. The panel for a flat panel display device as claimed in claim 1, wherein the projections of said first conducting layer on said surface of said substrate and those of said second conducting layer on said surface of said substrate are not overlapped.

10. The panel for a flat panel display device as claimed in claim 2, wherein said buffer conducting layer is made of indium tin oxide.

11. The panel for a flat panel display device as claimed in claim 3, further comprising a static eliminator wire adapted for connecting said guards of a number of said terminals.

12. The panel for a flat panel display device as claimed in claim 1, which said flat panel display device is a liquid crystal display device.

13. A flat panel display device, comprising at least one panel as claimed in claim 1.

14. The flat panel display device as claimed in claim 13, wherein said flat panel display device is a liquid crystal display device.

* * * * *